(12) United States Patent
Ollmann et al.

(10) Patent No.: US 9,099,222 B2
(45) Date of Patent: Aug. 4, 2015

(54) PATTERNED FILMS AND METHODS

(71) Applicant: Carestream Health, Inc., Rochester, NY (US)

(72) Inventors: Richard R. Ollmann, Woodbury, MN (US); Eric L. Granstrom, Andover, MN (US)

(73) Assignee: Carestream Health, Inc., Rochester, NY (US)

( * ) Notice: Subject to any disclaimer, the term of this patent is extended or adjusted under 35 U.S.C. 154(b) by 1 day.

(21) Appl. No.: 14/025,137

(22) Filed: Sep. 12, 2013

(65) Prior Publication Data

US 2014/0099486 A1 Apr. 10, 2014

Related U.S. Application Data

(60) Provisional application No. 61/711,843, filed on Oct. 10, 2012.

(51) Int. Cl.
*B32B 3/00* (2006.01)
*H01B 1/22* (2006.01)
*H01B 13/00* (2006.01)
*G06F 3/041* (2006.01)

(52) U.S. Cl.
CPC *H01B 1/22* (2013.01); *G06F 3/041* (2013.01); *G06F 3/0412* (2013.01); *H01B 13/0036* (2013.01); *G06F 2203/04103* (2013.01); *Y10T 428/24851* (2015.01)

(58) Field of Classification Search
CPC ............... H01B 1/02; H01B 1/22; H05K 3/06
See application file for complete search history.

(56) References Cited

U.S. PATENT DOCUMENTS

| 3,979,240 | A | 9/1976 | Ghezzo |
| 4,093,504 | A | 6/1978 | Ponjeé et al. |
| 5,094,978 | A | 3/1992 | Miyagaki et al. |
| 8,018,568 | B2 | 9/2011 | Allemand et al. |
| 8,049,333 | B2 | 11/2011 | Alden et al. |
| 2005/0083307 | A1 | 4/2005 | Aufderheide et al. |
| 2008/0138589 | A1 | 6/2008 | Wakabayashi et al. |
| 2008/0143906 | A1 | 6/2008 | Allemand et al. |
| 2010/0243295 | A1* | 9/2010 | Allemand et al. ............ 174/250 |
| 2011/0128252 | A1 | 6/2011 | Nah |
| 2012/0107600 | A1 | 5/2012 | Zou |
| 2012/0298930 | A1 | 11/2012 | Zou |

FOREIGN PATENT DOCUMENTS

| JP | 2012-146211 | 8/2012 |
| WO | 2008/046058 A2 | 4/2008 |

OTHER PUBLICATIONS

3M—Optically Clear Adhesives 8211, 8212, 8213, 8214, 8215, Technical Data, Jan. 2010, pp. 1-5.

* cited by examiner

*Primary Examiner* — Elizabeth Mulvaney
(74) *Attorney, Agent, or Firm* — Reed L. Christiansen

(57) ABSTRACT

Methods of patterning films that enable visual identification of patterned films and the patterned regions on them, while still achieving minimally discernible optical differences between the patterned and unpatterned regions in devices incorporating the patterned films. Such methods can exhibit wide successful manufacturing operating windows and the patterned films are useful in electronic applications.

16 Claims, 1 Drawing Sheet

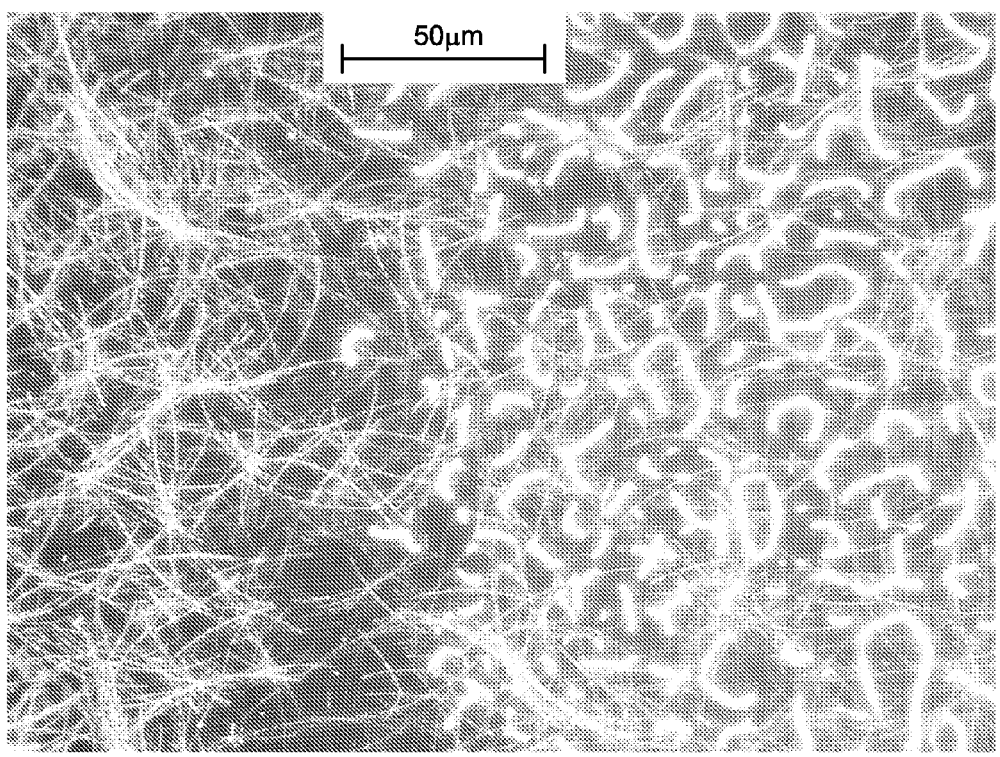

PATTERNED FILMS AND METHODS

CROSS REFERENCE TO RELATED APPLICATIONS

This application claims the benefit of U.S. Provisional Patent Application No. 61/711,843, filed Oct. 10, 2012, entitled PATTERNED FILMS AND METHODS, which is hereby incorporated by reference in its entirety.

BACKGROUND

Films employing metal nanowires, such as, for example, silver nanowires (AgNWs), are replacing films based on indium tin oxide (ITO) in some end-use applications, because of their improved transparency, durability, and flexibility.

For many applications, such as, for example, capacitive touch screen devices, films are patterned to provide regions of differing conductivities. The presence of a finger may thereby be detected by control circuitry attached to the patterned film. For films based on ITO, non-conductive regions can be formed by chemically etching and removing portions of the film. See, for example, Ghezzo, U.S. Pat. No. 3,979,240; Ponjee et al., U.S. Pat. No. 4,093,504; and Miyagaki et al., U.S. Pat. No. 5,094,978, each of which is hereby incorporated by reference in its entirety. This approach has also been applied to films based on AgNWs. See, for example, Allemand et al, U.S. patent application publication 2008/0143906 and Cambrios Technologies Corporation, PCT publication WO2008/046058.

In devices where the patterned film is positioned between an illuminated screen and the user, it is desirable that differences in optical properties between the patterned and unpatterned regions of the patterned film not be discernable by the user. One possible approach to address this problem is to control the patterning conditions so that the difference between the electrical conductivities of the patterned and unpatterned regions is sufficiently high to meet the electrical requirements of the device, while still maintaining minimally discernable differences between the optical properties of the patterned and unpatterned regions. See, for example, Allemand et al., U.S. Pat. No. 8,018,568, which is hereby incorporated by reference in its entirety.

SUMMARY

Partial patterning methods can be difficult to employ because of their very narrow successful manufacturing operating windows. Insufficient patterning jeopardizes electrical fitness-for-use, while excessive patterning endangers optical fitness-for-use. Because of such variables as spatial and lot-to-lot variations in film electrical conductivity, and run-to-run variation in patterning solution concentrations, temperatures, and exposure times, achieving consistent partially-patterned film products can be challenging. As partial patterning processes are scaled up to larger operating volumes and production rates, controlling the extent of patterning to remain in the successful manufacturing operating window becomes increasingly difficult.

Moreover, because of the intent to make the partially patterned and unpatterned regions optically indistinguishable, it is difficult in practice to visually distinguish an unpatterned film from a properly partially patterned film, making downstream device manufacture more error-prone. For example, in-process quality checks can be frustrated by lack of visual contrast between the unpatterned and partially patterned regions, hindering the ability for production systems and operators to obtain feedback on the state of the manufacturing process. Likewise, if inventories of unpatterned and partially patterned films are not properly labeled and/or segregated, it would easily be possible to incorporate an unpatterned film in a downstream device. Additionally, without being able to easily discern electrically conductive and non-conductive regions on the partially patterned film, assuring that proper connections had been made between the film and the device control circuitry becomes more difficult.

Applicants have developed methods of patterning films that enable visual identification of patterned films and the patterned regions on them, while still achieving minimally discernible optical differences between the patterned and unpatterned regions in devices incorporating the patterned films. Such methods can exhibit wide successful manufacturing operating windows and the patterned films are useful in electronic applications.

At least a first embodiment provides a method comprising forming on at least one transparent conductive film at least one patterned region and at least one unpatterned region, the at least one patterned region comprising at least one first optical property of at least one first optical property type and the at least one unpatterned region comprising at least one second optical property of the at least one first optical property type; and disposing at least one overcoat layer on the at least one patterned region and the at least one unpatterned region to form at least one covered patterned region comprising at least one third optical property of the at least one first optical property type and at least one covered unpatterned region comprising at least one fourth optical property of the at least one first optical property type, where the at least one first optical property and the at least one second optical property are distinguishable by the unaided eye, and the at least one third optical property and the at least one fourth optical property are less distinguishable by the unaided eye.

In some such embodiments, the at least one first optical property type comprises haze, total light transmission, or total light reflectance. In an exemplary embodiment, the at least one first optical property comprises a first haze, the at least one second optical property comprises a second haze, and the absolute value of the difference between the first haze and the second haze is at least about 1% haze, or at least about 2% haze, or at least about 3% haze, or at least about 5% haze, or at least about 10% haze, or at least about 15% haze, and the at least one third optical property comprises a third haze and the at least one fourth optical property comprises a fourth haze, and the absolute value of the difference between the third haze and the fourth haze is less than about 3% haze, or less than about 2% haze, or less than about 1% haze, or less than about 0.5% haze.

In some such embodiments, the at least one overcoat layer comprises at least first composition comprising at least one acrylic compound or silicone oil. In some cases, the at least one overcoat layer further comprises at least one first transparent substrate disposed on the at least one first composition, the at least one first transparent substrate comprising at least one polyester.

In some such embodiments, the at least one transparent conductive film comprises at least one transparent conductive layer comprising metal nanowires, such as, for example, silver nanowires. In some cases, the at least one transparent conductive layer comprises at least one cellulose ester polymer. In an exemplary embodiment, the at least one transparent conductive film further comprises at least one topcoat layer disposed on the at least one transparent conductive layer.

In some embodiments, forming the at least one patterned region and at least one unpatterned region comprises contacting the at least one transparent conductive film with at least one etchant or patterning the at least one transparent conductive film with a laser.

At least a second embodiment provides an article comprising at least one transparent conductive film comprising at least one patterned region and at least one unpatterned region, the at least one patterned region comprising at least one first optical property of at least one first optical property type and the at least one unpatterned region comprising at least one second optical property of the at least one first optical property type; and at least one overcoat layer disposed on the at least one film, the at least one overcoat layer comprising at least one first overcoat region disposed on the at least one patterned region and at least one second overcoat region disposed on the at least one unpatterned region, where at least one first covered region consisting of the at least one first overcoat region and the at least one patterned region comprises at least one third optical property of the at least one first optical property type, and at least one covered region consisting of the at least one second overcoat region and the at least one unpatterned region comprises at least one fourth optical property of the at least one first optical property type, and where the at least one first optical property and the at least one second optical property are distinguishable by the unaided eye, and the at least one third optical property and the at least one fourth optical property are less distinguishable by the unaided eye.

In some such embodiments, the at least one overcoat layer comprises at least first composition comprising at least one acrylic compound or silicone oil. In some cases, the at least one overcoat layer further comprises at least one first transparent substrate disposed on the at least one first composition, the at least one first transparent substrate comprising at least one polyester.

In some such embodiments, the at least one transparent conductive film comprises at least one transparent conductive layer comprising metal nanowires, such as, for example, silver nanowires. In some cases, the at least one transparent conductive layer comprises at least one cellulose ester polymer. In an exemplary embodiment, the at least one transparent conductive film further comprises at least one topcoat layer disposed on the at least one transparent conductive layer. Such a topcoat layer may, in some cases, be thermally cured or ultraviolet cured.

These embodiments and other variations and modifications may be better understood from the description of the drawings, description, exemplary embodiments, examples, and claims that follow. Any embodiments provided are given only by way of illustrative example. Other desirable objectives and advantages inherently achieved may occur or become apparent to those skilled in the art. The invention is defined by the appended claims.

DESCRIPTION OF THE DRAWINGS

FIG. 1 is a micrograph showing a film with an unpatterned region on the left-hand side and a patterned region on the right-hand side.

DESCRIPTION

All publications, patents, and patent documents referred to in this document are incorporated by reference herein in their entirety, as though individually incorporated by reference.

U.S. Provisional Patent Application No. 61/711,843, filed Oct. 10, 2012, entitled PATTERNED FILMS AND METHODS, is hereby incorporated by reference in its entirety.

Transparent Conductive Films

Transparent conductive films may comprise conductive microstructures or conductive nanostructures in one or more transparent conductive layers. Microstructures and nanostructures are defined according to the length of their shortest dimensions. The shortest dimension of the nanostructure is sized between 1 nm and 100 nm. The shortest dimension of the microstructure is sized between 0.1 µm to 100 µm. Conductive nanostructures may include, for example, metal nanostructures. In some embodiments, the conductive nanostructures may be metal nanowires, carbon nanotubes, metal meshes, transparent conductive oxide, and graphene. In some embodiments, the conductive nanostructures may be metal nanowires, such as, for example, silver nanowires. Examples of transparent conductive films comprising silver nanowires and methods for preparing them are disclosed in US patent application publication 2012/0107600, entitled "TRANSPARENT CONDUCTIVE FILM COMPRISING CELLULOSE ESTERS," which is hereby incorporated by reference in its entirety.

In some embodiments, the transparent conductive film may comprise a substrate upon which the one or more transparent conductive layers are disposed. The substrate may comprise a polymer, such as polyethylene terephthalate (PET). In some embodiments, one or more carrier layers, such as "interlayers" or "intermediate layers," may be located between the transparent conductive layers and the substrate. The carrier layer may, in some cases, be an "adhesion promotion layer" that improves adhesion between the transparent conductive layers and substrate. The carrier layer may be applied onto the substrate by various methods, such as by coating. In some embodiments, the carrier layer is sequentially applied with the application of the transparent conductive layers. In some embodiments, the carrier layer is simultaneously applied with the application of the transparent conductive layer. In some embodiments, the carrier layer comprises a single-phase mixture of at least one polymer. In some embodiments, the carrier layer comprises a hard coat layer. In such a case, the hard coat layer may be abrasion resistant.

A topcoat layer may optionally be disposed on the at least one transparent conductive layer. Such a topcoat may comprise one or more thermally cured or ultraviolet cured resins.

Patterned Regions and Unpatterned Regions

The transparent conductive films may be patterned to introduce regions of higher resistivity within the transparent conductive film, leaving other regions as lower resistivity regions. For the purpose of this application such regions are referred to as patterned regions and unpatterned regions, respectively. Any known method may be used to pattern the films, such as application of laser radiation or chemical etchants. Exemplary chemical etchants comprise ferric chloride and hydrogen chloride in an aqueous solution.

Overcoat Layers, Covered Patterned Regions, and Covered Unpatterned Regions

At least one overcoat layer may be disposed on the at least one patterned region and the at least one unpatterned region to form at least one covered patterned region and at least one covered unpatterned region, each of which may possess optical properties. Such an overcoat layer may, in some cases, comprise an index of refraction between about 1.4 and about 1.6, or between about 1.45 and about 1.55, or between about 1.46 and about 1.48. Overcoat layers may, for example, comprise at least one compound comprising at least one acrylic compound or silicone oil. A transparent substrate, such as, for example, a polyester, may in some cases be disposed on the at least one compound.

Optical Properties

The patterned and unpatterned regions of the film each comprise optical properties. In at least some embodiments, the optical properties of the patterned and unpatterned regions may be distinguishable to the unaided eye. Exemplary optical properties include haze, total light transmission, and total light reflectance. Percent haze and total light transmission may be determined according to ASTM method D-1003.

The at least one covered patterned region and the at least one covered unpatterned region each also comprise optical properties. In at least some embodiments, the differences in optical properties of the at least one covered patterned region and the at least one covered unpatterned regions are less distinguishable to the unaided eye than the differences between the optical properties of the at least one patterned region and the at least one unpatterned region. In some cases, the optical properties of the covered patterned regions and the covered unpatterned regions are indistinguishable to the unaided eye.

Articles

The patterned films of this application may be incorporated into articles, such as, for example, electronic displays, touch screens, portable telephones, cellular telephones, computer displays, laptop computers, tablet computers, point-of-purchase kiosks, music players, televisions, electronic games, electronic book readers, transparent electrodes, solar cells, light emitting diodes, other electronic devices, medical imaging devices, medical imaging media, and the like.

EXEMPLARY EMBODIMENTS

U.S. Provisional Patent Application No. 61/711,843, filed Oct. 10, 2012, entitled PATTERNED FILMS AND METHODS, which is hereby incorporated by reference in its entirety, disclosed the following 51 non-limiting exemplary embodiments:

A. A method comprising:

forming on at least one film at least one patterned region and at least one unpatterned region, the at least one patterned region comprising at least one first optical property of at least one first optical property type and the at least one unpatterned region comprising at least one second optical property of the at least one first optical property type; and disposing at least one overcoat layer on the at least one patterned region and the at least one unpatterned region to form at least one covered patterned region comprising at least one third optical property of the at least one first optical property type and at least one covered unpatterned region comprising at least one fourth optical property of the at least one first optical property type, wherein the at least one first optical property and the at least one second optical property are distinguishable by the unaided eye, and the at least one third optical property and the at least one fourth optical property are less distinguishable by the unaided eye.

B. The method according to embodiment A, wherein the at least one film comprises at least one transparent film.

C. The method according to embodiment A, wherein the at least one film comprises at least one conductive film.

D. The method according to embodiment A, wherein the at least one film comprises at least one transparent conductive film.

E. The method according to any of embodiments A-D, wherein the at least one first optical property type comprises haze, total light transmission, or total light reflectance.

F. The method according to any of embodiments A-D, wherein the at least one first optical property type comprises haze.

G. The method according to any of embodiments A-D, wherein the at least one first optical property comprises a first haze, the at least one second optical property comprises a second haze, and the absolute value of the difference between the first haze and the second haze is at least about 1% haze, or at least about 2% haze, or at least about 3% haze, or at least about 5% haze, or at least about 10% haze, or at least about 15% haze.

H. The method according to any of embodiments A-D, wherein the at least one third optical property comprises a third haze and the at least one fourth optical property comprises a fourth haze, and the absolute value of the difference between the third haze and the fourth haze is less than about 3% haze, or less than about 2% haze, or less than about 1% haze, or less than about 0.5% haze.

J. The method according to embodiments G and H.

K. The method according to any of embodiments A-D, wherein the at least one overcoat layer comprises at least one first composition having an index of refraction between about 1.4 and about 1.6.

L. The method according to any of embodiments A-D, wherein the at least one overcoat layer comprises at least one first composition having an index of refraction between about 1.45 and about 1.55.

M. The method according to any of embodiments A-D, wherein the at least one overcoat layer comprises at least one first composition having an index of refraction between about 1.46 and about 1.48.

N. The method according to any of embodiments A-D, wherein the at least one overcoat layer comprises at least first composition comprising at least one acrylic compound.

P. The method according to any of embodiments A-D, wherein the at least one overcoat layer comprises at least one first composition comprising silicone oil.

Q. The method according to any of embodiments K-P, wherein the at least one overcoat layer further comprises at least one first transparent substrate disposed on the at least one first composition.

R. The method according to embodiment Q, wherein the at least one first transparent substrate comprises at least one first polymer.

S. The method according to embodiment R, wherein the at least one first transparent substrate comprises at least one first polyester.

T. The method according to any of embodiments A-D, wherein the at least one film comprises at least one transparent conductive layer comprising metal nanowires.

U. The method according to any of embodiments A-D, wherein the at least one film comprises at least one transparent conductive layer comprising silver nanowires.

V. The method according to embodiments T or U, wherein the at least one film further comprises at least one transparent conductive layer comprising at least one cellulose ester polymer.

W. The method according to any of embodiments T-V, wherein the at least one film further comprises at least one topcoat layer disposed on the at least one transparent conductive layer.

X. The method according to embodiment W, wherein the at least one topcoat layer comprises at least one thermally cured topcoat layer.

Y. The method according to embodiment W, wherein the at least one topcoat layer comprises at least one ultraviolet cured topcoat layer.

Z. The method according to any of embodiments A-D, wherein forming on at least one film at least one patterned region and at least one unpatterned region comprises contacting the at least one transparent conductive film with at least one second composition.

AA. The method according to embodiment Z, wherein the at least one second composition comprises at least one etchant.

AB. The method according to embodiment Z, wherein the at least one second composition comprises ferric chloride.

AC. The method according to embodiment AB, wherein the at least one second composition further comprises hydrogen chloride.

AD. The method according to any of embodiments A-D, wherein forming on at least one film at least one patterned region and at least one unpatterned region comprises patterning with a laser.

AE. An article comprising:

at least one film comprising at least one patterned region and at least one unpatterned region, the at least one patterned region comprising at least one first optical property of at least one first optical property type and the at least one unpatterned region comprising at least one second optical property of the at least one first optical property type; and at least one overcoat layer disposed on the at least one film, the at least one overcoat layer comprising at least one first overcoat region disposed on the at least one patterned region and at least one second overcoat region disposed on the at least one unpatterned region, wherein at least one first covered region consisting of the at least one first overcoat region and the at least one patterned region comprises at least one third optical property of the at least one first optical property type, and at least one covered region consisting of the at least one second overcoat region and the at least one unpatterned region comprises at least one fourth optical property of the at least one first optical property type, and further wherein the at least one first optical property and the at least one second optical property are distinguishable by the unaided eye, and the at least one third optical property and the at least one fourth optical property are less distinguishable by the unaided eye.

AF. The article according to embodiment AE, wherein the at least one film comprises at least one transparent film.

AG. The article according to embodiment AE, wherein the at least one film comprises at least one conductive film.

AH. The article according to embodiment AE, wherein the at least one film comprises at least one transparent conductive film.

AJ. The article according to any of embodiments AE-AH, wherein the at least one first optical property type comprises haze, total light transmission, or total light reflectance.

AK. The article according to any of embodiments AE-AH, wherein the at least one first optical property type comprises haze.

AL. The article according to any of embodiments AE-AH, wherein the at least one first optical property comprises a first haze, the at least one second optical property comprises a second haze, and the absolute value of the difference between the first haze and the second haze is at least about 1% haze, or at least about 2% haze, or at least about 3% haze, or at least about 5% haze, or at least about 10% haze, or at least about 15% haze.

AM. The article according to any of embodiments AE-AH, wherein the at least one third optical property comprises a third haze and the at least one fourth optical property comprises a fourth haze, and the absolute value of the difference between the third haze and the fourth haze is less than about 3% haze, or less than about 2% haze, or less than about 1% haze, or less than about 0.5% haze.

AN. The article according to embodiments AL and AM.

AP. The article according to any of embodiments AE-AH, wherein the at least one overcoat layer comprises at least one first composition having an index of refraction between about 1.4 and about 1.6.

AQ. The article according to any of embodiments AE-AH, wherein the at least one overcoat layer comprises at least one first composition having an index of refraction between about 1.45 and about 1.55.

AR. The article according to any of embodiments AE-AH, wherein the at least one overcoat layer comprises at least one first composition having an index of refraction between about 1.46 and about 1.48.

AS. The article according to any of embodiments AE-AH, wherein the at least one overcoat layer comprises at least first composition comprising at least one acrylic compound.

AT. The article according to any of embodiments AE-AH, wherein the at least one overcoat layer comprises at least one first composition comprising silicone oil.

AU. The article according to any of embodiments AP-AT, wherein the at least one overcoat layer further comprises at least one first transparent substrate disposed on the at least one first composition.

AV. The article according to embodiment AU, wherein the at least one first transparent substrate comprises at least one first polymer.

AW. The article according to embodiment AU, wherein the at least one first transparent substrate comprises at least one first polyester.

AX. The article according to any of embodiments AE-AH, wherein the at least one film comprises at least one transparent conductive layer comprising metal nanowires.

AY. The article according to any of embodiments AE-AH, wherein the at least one film comprises at least one transparent conductive layer comprising silver nanowires.

AZ. The article according to embodiments AX or AY, wherein the at least one film further comprises at least one transparent conductive layer comprising at least one cellulose ester polymer.

BA. The article according to any of embodiments AX-AZ, wherein the at least one film further comprises at least one topcoat layer disposed on the at least one transparent conductive layer.

BB. The article according to embodiment BA, wherein the at least one topcoat layer comprises at least one thermally cured topcoat layer.

BC. The article according to embodiment BA, wherein the at least one topcoat layer comprises at least one ultraviolet cured topcoat layer.

EXAMPLES

Methods

Percent haze and total light transmission of films were measured using a BYK Gardner HAZEGARD instrument, according to ASTM method D-1003 (BYK Gardner, Columbia, Md.).

Surface resistivities were measured using a FLUKE® Model 189 multimeter (Fluke Corporation, Everett, Wash.).

Materials

Unless otherwise noted, materials were available from Sigma-Aldrich, Milwaukee, Wis.

Silver Nanowire Containing Transparent Conductive Film. Transparent conductive films were prepared comprising transparent polyester substrate, silver nanowire transparent conductive layers disposed on the substrates, and topcoat layers disposed on the transparent conductive layers. The silver nanowire transparent conductive layers were prepared as disclosed in U.S. Patent Application Publication No. 2012/0107600, published May 3, 2012, entitled TRANSPARENT CONDUCTIVE FILM COMPRISING CELLULOSE ESTERS, which is hereby incorporated by reference in its entirety. The topcoat layers were prepared as disclosed in U.S. Patent Application Publication No. 2012/0298930, published Nov. 29, 2012, entitled NANOSTRUCTURE COMPOSITIONS, COATINGS, AND FILMS, which is hereby incorporated by reference in its entirety.

TE-100 Etchant is an aqueous solution of 25-30 wt % ferric chloride and 1-5 wt % hydrogen chloride (Transene Company Inc., Danvers, Mass.).

3M™ Optically Clear Adhesive 8211 is a 1.0 mil (25 μm) acrylic adhesive layer sandwiched between two 2.0 mil (50 μm) polyester release liners. It has a typical refractive index of 1.473, as measured using the Sodium D line at 25° C. See 3M™ Optically Clear Adhesives 8211•8212•8213•8214•8215 Technical Data, January 2010, which is hereby incorporated by reference in its entirety. (3M Company, St. Paul, Minn.).

Example 1

Regions of ten samples of silver nanowire containing transparent conductive film were patterned at 60° C. for 45 sec using TE-100 Etchant (Transene). The resistivities of the patterned regions exceeded 50×10$^6$ ohms. FIG. 1 is a micrograph showing an unpatterned region on the left-hand side and a patterned region on the right-hand side.

The unpatterned and patterned regions of the ten films were evaluated for total light transmittance and haze, as shown in Tables I and II. On average, the patterned regions exhibited higher light transmittance and higher haze than the unpatterned films. Total light transmittance of the unpatterned regions ranged from 89.9% to 90.5%. Total light transmittance of the patterned regions ranged from 90.9% to 91.3%, which represented absolute increases in transmittance between the patterned and unpatterned films ranging from 0.6% to 1.2%. Haze of the unpatterned regions ranged from 1.74% to 2.52%. Haze of the patterned regions ranged from 5.12% to 14.4%, representing absolute increases in haze values between the patterned and unpatterned films ranging from 3.33% to 12.5%. The patterned regions of the ten films were visually distinguishable by the unaided eye from the unpatterned regions.

3M™ Optically Clear Adhesive 8211 was applied each of the ten samples by peeling off one of the polyester release liners from the adhesive, placing the exposed adhesive layer on the sample's silver nanowire layer, and then applying light pressure to the remaining polyester release liner to ensure good adhesion. The patterned and unpatterned regions of the ten OCA-coated films were then evaluated for total light transmittance and haze, as shown in Tables I and II. On average, the OCA-coated patterned regions exhibited higher light transmittance and lower haze than the OCA-coated unpatterned films. The absolute increases in light transmission between the OCA-coated patterned and OCA-coated unpatterned regions ranged from 0.0% to 0.9%. The absolute difference in haze between the OCA-coated patterned and OCA-coated unpatterned regions ranged from an increase of 0.07% to a decrease of 1.14%. The OCA-coated patterned and unpatterned regions were much less visually distinguishable by the unaided eye than the patterned and unpatterned regions of the samples that had no OCA-coating.

TABLE I

TOTAL LIGHT TRANSMITTANCES (% T)

| ID | Un-patterned % T | Patterned % T | Delta % T | OCA-Coated Unpatterned % T | OCA-Coated Patterned % T | OCA-Coated Delta % T |
|---|---|---|---|---|---|---|
| 1-1 | 90.1 | 91.0 | +0.9 | 89.2 | 89.8 | +0.6 |
| 1-2 | 90.3 | 91.1 | +0.8 | 88.9 | 88.9 | 0.0 |
| 1-3 | 90.3 | 90.9 | +0.6 | 88.5 | 89.4 | +0.9 |
| 1-4 | 90.3 | 90.9 | +0.6 | 89.1 | 89.2 | +0.1 |
| 1-5 | 89.9 | 91.1 | +1.2 | 88.8 | 89.5 | +0.7 |
| 1-6 | 90.1 | 91.2 | +1.1 | 88.9 | 89.2 | +0.3 |
| 1-7 | 90.3 | 91.3 | +1.0 | 88.7 | 89.4 | +0.7 |
| 1-8 | 90.3 | 91.0 | +0.7 | 88.8 | 89.7 | +0.9 |
| 1-9 | 90.5 | 91.2 | +0.7 | 88.9 | 89.2 | +0.3 |
| 1-10 | 90.2 | 91.0 | +0.8 | 89.4 | 89.8 | +0.4 |
| AVG | 90.23 | 91.07 | +0.84 | 88.92 | 88.41 | +0.49 |

TABLE II

PERCENT HAZE

| ID | Un-patterned % Haze | Patterned % Haze | Delta % Haze | OCA-Coated Un-patterned % Haze | OCA-Coated Patterned % Haze | OCA-Coated Delta % Haze |
|---|---|---|---|---|---|---|
| 1-1 | 2.12 | 6.45 | +4.33 | 3.94 | 3.18 | −0.76 |
| 1-2 | 2.28 | 12.50 | +10.22 | 3.77 | 3.51 | −0.26 |
| 1-3 | 1.74 | 5.12 | +3.38 | 4.02 | 3.61 | −0.41 |
| 1-4 | 2.15 | 10.50 | +8.35 | 3.87 | 3.59 | −0.28 |
| 1-5 | 2.04 | 6.79 | +4.75 | 3.81 | 2.91 | −0.90 |
| 1-6 | 2.00 | 12.50 | +10.50 | 3.73 | 3.80 | +0.07 |
| 1-7 | 1.90 | 14.40 | +12.50 | 4.16 | 4.20 | +0.04 |
| 1-8 | 2.21 | 10.20 | +7.99 | 3.47 | 3.26 | −0.21 |
| 1-9 | 1.76 | 12.50 | +10.74 | 4.30 | 4.13 | −0.17 |
| 1-10 | 2.52 | 5.85 | +3.33 | 4.24 | 3.10 | −1.14 |
| AVG | 2.07 | 9.68 | +7.61 | 3.93 | 3.53 | −0.40 |

Example 2

Regions of six samples of silver nanowire containing transparent conductive film were patterned at 60° C. for 45 sec using TE-100 Etchant (Transene). The resistivities of the patterned regions exceeded 50×10$^6$ ohms. The unpatterned and patterned regions of the six films were evaluated for to haze, as shown in Table III. On average, the patterned regions exhibited higher haze than the unpatterned films. Haze of the unpatterned regions ranged from 1.88% to 2.11%. Haze of the patterned regions ranged from 5.62% to 18.90%, representing absolute increases in haze values between the patterned and unpatterned films ranging from 3.74% to 16.79%. The patterned regions of the six films were visually distinguishable by the unaided eye from the unpatterned regions.

Silicone oil was applied each of the six samples, and then 5 mil (125 μm) polyethylene terephthalate (PET) films were placed on the silicone oil so that there were no gaps or air pockets between the silicone oil and the PET film. The silicone oil formed a substantially uniform layer between the surface of the transparent conductive film and the PET film. The patterned and unpatterned regions of the six silicone oil/PET-coated films were then evaluated for haze, as shown in Table III. On average, the silicone oil/PET-coated patterned regions exhibited lower haze than the silicone oil/PET-coated unpatterned films. The absolute difference in haze between the silicone oil/PET-coated patterned and silicone oil/PET-coated unpatterned regions ranged from an increase of 0.14% to a decrease of 0.68%. The silicone oil/PET-coated patterned and unpatterned regions were much less visually distinguishable by the unaided eye than the patterned and unpatterned regions of the samples that had no silicone oil/PET-coating.

TABLE III

PERCENT HAZE

| ID | Un-patterned % Haze | Patterned % Haze | Delta % Haze | Silicone Oil/PET-Coated Un-patterned % Haze | Silicone Oil/PET-Coated Patterned % Haze | Silicone Oil/PET-Coated Delta % Haze |
|---|---|---|---|---|---|---|
| 2-1 | 2.11 | 18.90 | +16.79 | 2.09 | 2.23 | 0.14 |
| 2-2 | 1.97 | 10.40 | +8.43 | 2.18 | 1.50 | −0.68 |
| 2-3 | 1.88 | 5.62 | +3.74 | 2.06 | 1.49 | −0.57 |
| 2-4 | 1.97 | 7.87 | +5.90 | 1.84 | 1.49 | −0.35 |
| 2-5 | 1.99 | 9.02 | +7.03 | 1.86 | 1.35 | −0.51 |
| 2-6 | 2.00 | 8.32 | +6.32 | 1.74 | 1.74 | 0.00 |
| AVG | 1.99 | 10.02 | +8.04 | 1.96 | 1.63 | −0.33 |

Example 3

Silver nanowire containing transparent conductive films were patterned at 40° C., 50° C., 60° C., and 70° C., using TE-100 Etchant (Transene). Surface resistance, and percent haze were measured as a function of time of exposure to the etchant. After about 600 seconds at 40° C., about 200 seconds at 50° C., about 60 seconds at 60° C., and about 30 seconds at 70° C., the percent haze leveled off at increased levels relative to the unetched materials. By these times, the surface resistance had also leveled off at low levels. This suggests that after some minimum patterning time at temperature, the patterning process will line-out at a terminal percent haze and conductivity.

Example 4

Comparative

Silver nanowire containing transparent conductive films were patterned at 40° C. and 60° C., using aqua regia. No increase in haze was seen by 800 seconds at 40° C. or by 250 seconds at 60° C. This suggests that aqua regia would not be suitable for use in the claimed methods.

The invention has been described in detail with reference to particular embodiments, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced within.

What is claimed:

1. A method comprising:
    forming on at least one transparent conductive film at least one patterned region and at least one unpatterned region, the at least one patterned region comprising at least one first optical property of at least one first optical property type and the at least one unpatterned region comprising at least one second optical property of the at least one first optical property type; and
    disposing at least one overcoat layer on the at least one patterned region and the at least one unpatterned region to form at least one covered patterned region comprising at least one third optical property of the at least one first optical property type and at least one covered unpatterned region comprising at least one fourth optical property of the at least one first optical property type,
    wherein the at least one first optical property and the at least one second optical property are distinguishable by the unaided eye, and the at least one third optical property and the at least one fourth optical property are less distinguishable by the unaided eye, and
    further wherein the at least one first optical property comprises a first haze, the at least one second optical property comprises a second haze, and the absolute value of the difference between the first haze and the second haze is at least about 1% haze, or at least about 2% haze, or at least about 3% haze, or at least about 5% haze, or at least about 10% haze, or at least about 15% haze, and further wherein the at least one third optical property comprises a third haze and the at least one fourth optical property comprises a fourth haze, and the absolute value of the difference between the third haze and the fourth haze is less than about 3% haze, or less than about 2% haze, or less than about 1% haze, or less than about 0.5% haze.

2. The method according to claim 1, wherein the at least one overcoat layer comprises at least first composition comprising at least one acrylic compound or silicone oil.

3. The method according to claim 1, wherein the at least one overcoat layer further comprises at least one first transparent substrate disposed on the at least one first composition, the at least one first transparent substrate comprising at least one polyester.

4. The method according to 1, wherein the at least one transparent conductive film comprises at least one transparent conductive layer comprising metal nanowires.

5. The method according to claim 4, wherein the metal nanowires comprise silver nanowires.

6. The method according to claim 4, wherein the at least one transparent conductive layer comprises at least one cellulose ester polymer.

7. The method according to any of claim 4, wherein the at least one transparent conductive film further comprises at least one topcoat layer disposed on the at least one transparent conductive layer.

8. The method according to claim 1, wherein forming the at least one patterned region and at least one unpatterned region comprises contacting the at least one transparent conductive film with at least one etchant or patterning the at least one transparent conductive film with a laser.

9. An article comprising:
    at least one transparent conductive film comprising at least one patterned region and at least one unpatterned region, the at least one patterned region comprising at least one first optical property of at least one first optical property type and the at least one unpatterned region comprising at least one second optical property of the at least one first optical property type; and
    at least one overcoat layer disposed on the at least one film, the at least one overcoat layer comprising at least one first overcoat region disposed on the at least one patterned region and at least one second overcoat region disposed on the at least one unpatterned region,
    wherein at least one first covered region consisting of the at least one first overcoat region and the at least one patterned region comprises at least one third optical property of the at least one first optical property type, and at least one covered region consisting of the at least one second overcoat region and the at least one unpatterned region comprises at least one fourth optical property of the at least one first optical property type, and further wherein the at least one first optical property and the at least one second optical property are distinguishable by the unaided eye, and the at least one third optical property and the at least one fourth optical property are less distinguishable by the unaided eye, and further wherein the at least one first optical property comprises a first haze, the at least one second optical property comprises a second haze, and the absolute value of the difference between the first haze and the second haze is at least about 1% haze, or at least about 2% haze, or at least about 3% haze, or at least about 5% haze, or at least about 10% haze, or at least about 15% haze, and further wherein the at least one third optical property comprises a third haze and the at least one fourth optical property comprises a fourth haze, and the absolute value of the difference between the third haze and the fourth haze is less than about 3% haze, or less than about 2% haze, or less than about 1% haze, or less than about 0.5% haze.

10. The article according to claim 9, wherein the at least one overcoat layer comprises at least first composition comprising at least one acrylic compound or silicone oil.

11. The article according to claim 9, wherein the at least one overcoat layer further comprises at least one first transparent substrate disposed on the at least one first composition, the at least one first transparent substrate comprising at least one polyester.

12. The article according to claim 9, wherein the at least one film comprises at least one transparent conductive layer comprising metal nanowires.

13. The article according to claim 12, wherein the metal nanowires comprise silver nanowires.

14. The article according to claim 12, wherein the at least one transparent conductive layer comprises at least one cellulose ester polymer.

15. The article according to claim 12, wherein the at least one transparent conductive film further comprises at least one thermally cured topcoat layer disposed on the at least one transparent conductive layer.

16. The article according to claim 12, wherein the at least one transparent conductive film further comprises at least one ultraviolet cured topcoat layer disposed on the at least one transparent conductive layer.

* * * * *